(12) United States Patent
Kamerbeek et al.

(10) Patent No.: US 9,271,601 B2
(45) Date of Patent: Mar. 1, 2016

(54) SYSTEM, METHOD AND CAPSULE FOR PREPARING A BEVERAGE

(75) Inventors: Ralf Kamerbeek, De Meern (NL); John Henri Flamand, Lunteren (NL); Angenita Dorothea van Loon-Post, Utrecht (NL); Hendrik Cornelis Koeling, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 456 days.

(21) Appl. No.: 13/323,640

(22) Filed: Dec. 12, 2011

(65) Prior Publication Data
US 2012/0148709 A1 Jun. 14, 2012

Related U.S. Application Data

(63) Continuation of application No. PCT/NL2009/050820, filed on Dec. 30, 2009.

(30) Foreign Application Priority Data

| Jun. 17, 2009 | (EP) | 09162917 |
| Jun. 17, 2009 | (EP) | 09162927 |
| Jun. 17, 2009 | (EP) | 09162941 |
| Jun. 17, 2009 | (EP) | 09162984 |

(51) Int. Cl.
*A47J 31/06* (2006.01)
*A47J 31/44* (2006.01)
(Continued)

(52) U.S. Cl.
CPC .............. *A47J 31/407* (2013.01); *A23F 5/262* (2013.01); *A47J 31/0673* (2013.01); *A47J 31/368* (2013.01); *B65D 85/8043* (2013.01); *A47J 31/005* (2013.01); *A47J 31/0663* (2013.01)

(58) Field of Classification Search
CPC ........ A23G 9/045; A47J 31/005; A47J 31/46; A47J 31/057; A47J 31/0663; A47J 31/0573; A47J 31/401; B65D 85/8043

USPC .............. 99/279, 290, 295, 300, 302 R, 307, 99/323.3
See application file for complete search history.

(56) References Cited

U.S. PATENT DOCUMENTS

| 3,615,708 A | 10/1971 | Abile-Gal |
| 4,321,139 A | 3/1982 | Auclair |

(Continued)

FOREIGN PATENT DOCUMENTS

| CH | 434609 | 10/1967 |
| CN | 1126462 | 7/1996 |

(Continued)

OTHER PUBLICATIONS

International Search Report for PCT/NL2009/050834, mailing date Mar. 2, 2010, 3 pages.

(Continued)

*Primary Examiner* — Dana Ross
*Assistant Examiner* — Hemant Matthew
(74) *Attorney, Agent, or Firm* — Foley & Lardner LLP

(57) ABSTRACT

The invention relates to a system, method and capsule for preparing a predetermined quantity of beverage suitable for consumption using an extractable product. The system comprises an exchangeable capsule, and an apparatus comprising a receptacle for holding the exchangeable capsule, and a fluid dispensing device for supplying a fluid to the exchangeable capsule. The capsule comprises an exit area to allow draining from the prepared beverage from the capsule there through, wherein the exit area comprises a filter layer. The filter layer comprises a layer of non-woven and/or woven fibrous material with at least one first region where the non-woven and/or woven material has been sealed to prevent egress of liquid there through and at least one second region where the non-woven and/or woven material has not been sealed to allow egress of liquid there through.

17 Claims, 3 Drawing Sheets

(51) Int. Cl.
  *A47J 31/40* (2006.01)
  *A47J 31/36* (2006.01)
  B65D 85/804 (2006.01)
  *A23F 5/26* (2006.01)
  *A47J 31/00* (2006.01)

(56) References Cited

U.S. PATENT DOCUMENTS

| | | | |
|---|---|---|---|
| 4,417,504 A | 11/1983 | Yamamoto | |
| 4,859,337 A | 8/1989 | Woltermann | |
| 5,325,765 A | 7/1994 | Sylvan et al. | |
| 5,398,595 A * | 3/1995 | Fond et al. | 99/295 |
| 5,472,719 A | 12/1995 | Favre | |
| 5,840,189 A | 11/1998 | Sylvan et al. | |
| D408,679 S | 4/1999 | Potts et al. | |
| 5,897,899 A * | 4/1999 | Fond | 426/112 |
| 6,026,732 A * | 2/2000 | Kollep et al. | 99/295 |
| 6,079,315 A | 6/2000 | Beaulieu et al. | |
| 6,082,247 A | 7/2000 | Beaulicu | |
| 6,142,063 A | 11/2000 | Beaulieu et al. | |
| 6,182,554 B1 | 2/2001 | Beaulieu et al. | |
| D452,433 S | 12/2001 | Lazaris | |
| D452,434 S | 12/2001 | Sweeney | |
| 6,440,256 B1 | 8/2002 | Gordon et al. | |
| D462,865 S | 9/2002 | Honan et al. | |
| D474,110 S | 5/2003 | Sweeney | |
| D474,111 S | 5/2003 | Lazaris | |
| 6,589,577 B2 | 7/2003 | Lazaris et al. | |
| 6,606,938 B2 | 8/2003 | Taylor | |
| 6,607,762 B2 | 8/2003 | Lazaris et al. | |
| 6,644,173 B2 | 11/2003 | Lazaris et al. | |
| 6,645,537 B2 | 11/2003 | Sweeney et al. | |
| 6,655,260 B2 | 12/2003 | Lazaris et al. | |
| 6,658,989 B2 | 12/2003 | Sweeney et al. | |
| 6,666,130 B2 | 12/2003 | Taylor et al. | |
| 6,672,200 B2 | 1/2004 | Duffy et al. | |
| 6,708,600 B2 | 3/2004 | Winkler et al. | |
| D489,215 S | 5/2004 | Honan et al. | |
| 6,854,378 B2 * | 2/2005 | Jarisch et al. | 99/295 |
| D502,362 S | 3/2005 | Lazaris et al. | |
| D513,572 S | 1/2006 | Schaffeld et al. | |
| 7,165,488 B2 | 1/2007 | Bragg et al. | |
| D544,299 S | 6/2007 | Schaffeld et al. | |
| D554,299 S | 10/2007 | Ragonetti et al. | |
| 7,279,188 B2 * | 10/2007 | Arrick et al. | 426/115 |
| 7,318,372 B2 * | 1/2008 | Cooke | 99/290 |
| 7,347,138 B2 | 3/2008 | Bragg et al. | |
| 7,360,418 B2 | 4/2008 | Pelovitz | |
| 7,377,162 B2 | 5/2008 | Lazaris | |
| 7,398,726 B2 | 7/2008 | Streeter et al. | |
| 7,412,921 B2 * | 8/2008 | Hu et al. | 99/295 |
| 7,513,192 B2 | 4/2009 | Sullivan et al. | |
| 7,523,695 B2 | 4/2009 | Streeter et al. | |
| 7,543,527 B2 | 6/2009 | Schmed | |
| 7,552,672 B2 | 6/2009 | Schmed | |
| 7,640,845 B2 | 1/2010 | Woodnorth et al. | |
| 7,856,920 B2 | 12/2010 | Schmed et al. | |
| 2001/0052294 A1 * | 12/2001 | Schmed | 99/295 |
| 2003/0089245 A1 * | 5/2003 | Kollep et al. | 99/495 |
| 2003/0096038 A1 | 5/2003 | Cai | |
| 2003/0172813 A1 * | 9/2003 | Schifferle | 99/275 |
| 2003/0222089 A1 * | 12/2003 | Hale | 220/912 |
| 2004/0045443 A1 | 3/2004 | Lazaris et al. | |
| 2004/0188459 A1 | 9/2004 | Halliday et al. | |
| 2004/0228955 A1 * | 11/2004 | Denisart et al. | 426/590 |
| 2005/0051478 A1 | 3/2005 | Karanikos et al. | |
| 2005/0150391 A1 | 7/2005 | Schifferle | |
| 2005/0172822 A1 * | 8/2005 | Macchi et al. | 99/295 |
| 2005/0205601 A1 | 9/2005 | Taylor | |
| 2005/0287251 A1 | 12/2005 | Lazaris et al. | |
| 2006/0110507 A1 * | 5/2006 | Yoakim et al. | 426/433 |
| 2006/0174773 A1 | 8/2006 | Taylor | |
| 2006/0292012 A1 | 12/2006 | Brudevold et al. | |
| 2007/0202237 A1 * | 8/2007 | Yoakim et al. | 426/590 |
| 2007/0224319 A1 * | 9/2007 | Yoakim et al. | 426/433 |
| 2008/0095904 A1 | 4/2008 | Sullivan et al. | |
| 2008/0115674 A1 | 5/2008 | Huang et al. | |
| 2008/0134902 A1 | 6/2008 | Zimmerman et al. | |
| 2009/0126577 A1 | 5/2009 | Ternite | |
| 2010/0024658 A1 | 2/2010 | Jacobs et al. | |
| 2010/0303964 A1 | 12/2010 | Beaulieu et al. | |

FOREIGN PATENT DOCUMENTS

| | | |
|---|---|---|
| CN | 101309840 | 11/2008 |
| CN | 101410041 | 4/2009 |
| CN | 101421172 | 4/2009 |
| EP | 1 555 219 | 7/2005 |
| FR | 2 617 389 | 1/1989 |
| FR | 2617389 | 1/1989 |
| GB | 1 256 247 A | 12/1971 |
| JP | 2000-336570 | 12/2000 |
| JP | 2006-034683 | 2/2006 |
| WO | WO-02/081337 A1 | 10/2002 |
| WO | WO-03/059778 A2 | 7/2003 |
| WO | WO-2006/111807 | 10/2006 |
| WO | WO-2008/078990 | 7/2008 |
| WO | WO 2008/117329 | 10/2008 |
| WO | WO-2008/132571 A1 | 11/2008 |
| WO | WO-2009/110783 | 9/2009 |

OTHER PUBLICATIONS

Japanese Office Action and Translation thereof for Japanese Application No. 2012-516008, dated Aug. 2, 2013, 5 pages.
Office Action and Search Report for Chinese application 200980160935.3 with English Translation, mailed Nov. 19, 2013. 14 pages.
Office Action for Chinese Application No. 200980160984.7, mail date Nov. 5, 2013, 22 pages.
Search Report for Chinese Application No. 200980160984.7, mail date Oct. 28, 2013, 2 pages.

* cited by examiner

SYSTEM, METHOD AND CAPSULE FOR PREPARING A BEVERAGE

CROSS-REFERENCE TO RELATED PATENT APPLICATIONS

The present application is a continuation of International Patent Application No. PCT/NL2009/050820, filed Dec. 30, 2009, which claims priority to European Patent Application Nos. 09162941.0, filed Jun. 17, 2009; 09162917.0, filed Jun. 17, 2009; 09162927.9, filed Jun. 17, 2009, and 09162984.0, filed Jun. 17, 2009—all of which are hereby incorporated herein by reference.

BACKGROUND

The invention relates to a system for preparing a predetermined quantity of beverage suitable for consumption using an extractable product, comprising an exchangeable capsule, and an apparatus comprising a receptacle for holding the exchangeable capsule, and a fluid dispensing device for supplying an amount of a fluid, such as water, under pressure to the exchangeable capsule, wherein the exchangeable capsule comprises a circumferential wall, a bottom closing the circumferential wall at a first end, and a lid closing the circumferential wall at a second end opposite the bottom, wherein the wall, bottom and lid enclose an inner space comprising the extractable product, wherein the bottom comprises an entrance area and the system is arranged for bringing the fluid dispensing device in fluid connection with the entrance area for supplying the fluid to the extractable product for preparing the beverage, and wherein the lid comprises an exit area and the system comprises an outlet which, in use, is in fluid communication with the exit area for draining the prepared beverage from the capsule and supplying the beverage to a container such as a cup.

Such a system using a capsule is known per se. The capsule may have an open end that, prior to use, is open to ambient atmosphere, although the open capsule may be contained in an e.g. airtight or gastight outer package. The open end of the capsule may be provided with a filter sheet or other perforate and/or porous filter. The open capsule may for example comprise roasted and ground coffee as extractable product. The capsule may be used for preparing a predetermined quantity of coffee in a suitable apparatus. A drawback of the known capsule is that the reproducibility of the beverage may be poor.

SUMMARY

It is an object of the invention to improve the above system, and more specifically to at least diminish the above problem.

Thereto, according to the invention, a system is provided for preparing a predetermined quantity of beverage suitable for consumption using an extractable product, comprising an exchangeable capsule, and an apparatus comprising a receptacle for holding the exchangeable capsule, and a fluid dispensing device for supplying an amount of a fluid, such as water, under pressure to the exchangeable capsule, wherein the exchangeable capsule comprises a substantially rigid circumferential wall, a bottom closing the circumferential wall at a first end, and a lid closing the circumferential wall at a second end opposite the bottom, wherein the wall, bottom and lid enclose an inner space comprising the extractable product, wherein the bottom comprises an entrance area and the system is arranged for bringing the fluid dispensing device in fluid connection with the entrance area for supplying the fluid to the extractable product for preparing the beverage, wherein the lid comprises an exit area and the system comprises an outlet which, in use, is in fluid communication with the exit area for draining the prepared beverage from the capsule and supplying the beverage to a container such as a cup, wherein the receptacle is arranged for draining the prepared beverage from the capsule through the exit area, wherein the exit area of the capsule comprises a filter layer, wherein the filter layer comprises a layer of a non-woven and/or woven fibrous material, wherein the filter layer comprises at least one first region where the non-woven and/or woven material has been sealed to prevent egress of liquid there through, and at least one second region where the non-woven and/or woven material has not been sealed to allow egress of liquid there through.

By providing a layer of non-woven and/or woven fibrous material with a first region where the non-woven and/or woven material has been sealed and a second region where the non-woven and/or woven material has not been sealed, the second region may define 'openings' through which the liquid may flow having stable dimensions, i.e. the dimensions of the second regions will not vary under fluid pressure. Further, the non-woven and/or woven material in the second regions may act as a filter preventing coffee grounds from leaving the capsule. Sealing the non-woven and/or woven material may be done by heating and/or melting the non-woven and/or woven material locally, preferably only in the first regions. Also, other methods of sealing may be used, such as gluing, painting or providing a resin in the first regions.

By providing a non-woven and/or woven fibrous material that is sealed in first regions and not sealed in second regions, deformation and/or rupture of the second regions and thus of the openings through which the fluid may flow, may be avoided. By avoiding deformation and/or rupture of the second regions, the pressure in the capsule may be more reproducible from one capsule to another. Also the quality of the prepared beverage may be approximately more constant from capsule to capsule. Beverage prepared with a capsule according to the invention may have an improved quality and may be more reproducible from one capsule to another capsule.

By providing also the entrance area in the bottom with a filter layer, wherein the filter layer comprises a layer of non-woven and/or woven material wherein the filter layer comprises at least one first region where the non-woven and/or woven material has been sealed to prevent egress of liquid there through, and at least one second region where the non-woven and/or woven material has not been sealed to allow egress of liquid there through, also the entrance filter layer may add to a reproducible pressure development in the capsule. Also, by providing a filter at the entrance area, it may be avoided that extractable product is spilled from the capsule at the bottom, e.g. due to the high pressure. By providing an entrance filter of non-woven and/or woven fibrous material with first and second regions, a stable entrance area may be provided with a reliable and reproducible pressure development in the capsule. The flow restriction for the fluid may be provided by the non-woven and/or woven fibrous material filter layer.

Non-woven fibrous material is understood to comprise fibers and/or filaments that can be relatively long and/or relatively short, but that are arranged in a rather chaotic way in the material. No preferred orientation of the fibers and/or filaments and/or no arrangement and/or organization of the fibers and/or filaments are present in the material. An example of a non-woven fibrous material is Tyvek®.

Paperlike material can be seen as a non-woven material comprising fibers in a chaotic, non-preferential arrangement.

Woven fibrous material is understood to comprise fibers and/or filaments that can be relatively long and/or relatively short. The fibers and/or filaments are woven. Commonly known woven material may comprise fibers and/or filaments in a first direction that are crossed by fibers and/or filaments in a second direction, for example transverse to the first direction. Knitted fiber material may in the context of this invention also be understood to be woven material.

Both filter layers of non-woven and woven fibrous material have advantageous elastic characteristics, i.e. they are relatively inelastic in the plane of the filter layer. In the plane of the layer, the filter layer may not stretch too much such that openings in the layer may approximately remain undeformed when under tension e.g. due to pressure in the capsule.

In an embodiment, the non-woven and/or woven material comprises polymeric fibers, such as polypropylene or polyethylene. By providing polymeric fibers, the non-woven and/or woven filter layer may be less susceptible to deformations due to the fluid pressure. Also, the non-woven and/or woven material may comprise biodegradable fibers, such as paper fibers. The walls of the capsule may e.g. be made from biodegradable material, with a biodegradable filter, the complete capsule may be biodegradable. After use, the consumer may throw away the biodegradable capsule e.g. in a special compost container. In an other embodiment, the walls of the capsule and/or the entrance layer and/or the exit layer may be provided from recyclable plastics. The filter layer of non-woven and/or woven material may be recyclable as well. In an other embodiment, the walls of the capsule and/or the entrance layer and/or the exit layer may be provided from metal for example for a re-usable capsule, e.g. when the capsule can be refilled by the user. The non-woven and/or woven filter layer and/or the capsule can e.g. be provided from dishwasher-proof fibrous material.

In an embodiment, the filter layer is a multi-layer filter comprising a further layer, wherein the further layer is a perforate and/or porous layer. By providing a further layer, the non-woven and/or woven filter layer may become stronger and more resistant to the high fluid pressure. By providing the further layer with perforations and/or porosity, fluid can flow through the filter layer in the exit and/or entrance area. Preferably, the layers are bonded together to give one another additional strength and/or stiffness.

In a further embodiment, the further layer may be of a non-woven and/or woven material, the filter layer may be a multi-layer filter in a relatively easy and cost-effective way. Preferably, the layers are bonded together to give one another additional strength and/or stiffness. Preferably, the layers are bonded together over approximately the entire first regions. Preferably, the second regions mainly overlap between the multiple layers to allow a passage for the fluid.

The second regions of the filter layer, where the non-woven and/or woven material has not been sealed to allow egress of liquid there through, may be distributed over substantially the entire surface of the filter layer. By distributing the 'openings' over substantially the entire surface of the filter layer, an approximately even pressure distribution may be reached over the filter layer to allow an approximately uniform pressure development over the entrance area of the capsule. It may be possible to concentrate the openings in a centre area of the filter layer, and to leave the peripheral edge of the filter layer free from openings.

In an advantageous embodiment, the openings and/or perforations of the further layer correspond with the second regions of the layer of non-woven and/or woven material to allow fluid passing there through.

In an embodiment, the receptacle comprises bottom piercing means intended for piercing the entrance area of an alternative capsule for creating at least one entrance opening for supplying the fluid to the extractable product through said at least one entrance opening. The capsule of the system according to the invention is arranged such that the entrance area of the capsule comprises an entrance filter for supplying the fluid to the extractable product there through which entrance filter, in use, is positioned at a distance from the bottom piercing means, such that the capsule of the system is not pierced by the bottom piercing means and the bottom stays intact.

In a further embodiment, the receptacle comprises lid piercing means intended for piercing the exit area of an alternative capsule when the exit area sufficiently presses against the lid piercing means under the influence of the pressure of the fluid and/or beverage in the capsule for creating at least one exit opening through which the beverage can drain from the alternative capsule. The capsule of the system according to the invention is arranged such that the exit area of the capsule of the system comprises an exit filter, through which the beverage can drain from the capsule of the system, wherein the lid piercing means and the exit filter are adapted to each other such that the capsule of the system, in use, is not pierced by the lid piercing means and the lid stays intact.

The fluid dispensing device of the system may be arranged for supplying the fluid to the exchangeable capsule under a pressure of approximately 4-20 bars, preferably 4.5-18 bars, more preferably 5-15 bars. In an embodiment, a pressure of approximately twelve bars is supplied to the capsule. Other pressures may be applied in other embodiments. For example, the extractable product may comprise coffee grains, and the system may be arranged for making an espresso and/or coffee type of beverage.

The invention further relates to a capsule with a non-woven and/or woven filter layer for use in such a system.

The invention also relates to the use of a capsule with a non-woven and/or woven filter layer using an apparatus of such a system.

The invention also relates to a method for preparing a predetermined quantity of beverage suitable for consumption using an extractable product, comprising providing an exchangeable capsule, comprising a circumferential wall, a bottom closing the circumferential wall at a first end, and a lid closing the circumferential wall at a second end opposite the bottom wherein the circumferential wall, bottom and lid enclose an inner space comprising the extractable product, providing an apparatus comprising a receptacle for holding the exchangeable capsule, a fluid dispensing device for supplying an amount of a fluid, such as water, under pressure to the exchangeable capsule for preparing the beverage, and an outlet which, in use, is in fluid communication with the capsule for draining the prepared beverage from the capsule and supplying the beverage to a container such as a cup, supplying the fluid to the extractable product for preparing the beverage, wherein the lid of the capsule comprises an exit area for draining the prepared beverage there through, wherein the exit area of the capsule comprises a filter layer, wherein the filter layer comprises a layer of a non-woven and/or woven fibrous material, wherein the filter layer comprises at least one first region where the non-woven and/or woven material has been sealed to prevent egress of liquid there through, and at least one second region where the non-woven and/or woven material has not been sealed to allow egress of liquid there through.

Further advantageous embodiments may be found in the dependent claims.

BRIEF DESCRIPTION OF THE DRAWINGS

The invention will further be elucidated by means of non-limiting examples referring to a drawing in which.

In this description, identical or corresponding items have identical or corresponding reference numerals. The exemplary embodiments shown should not be construed to be limitative in any manner and serve merely as illustration.

DETAILED DESCRIPTION OF EXEMPLARY EMBODIMENTS

Figure 1:
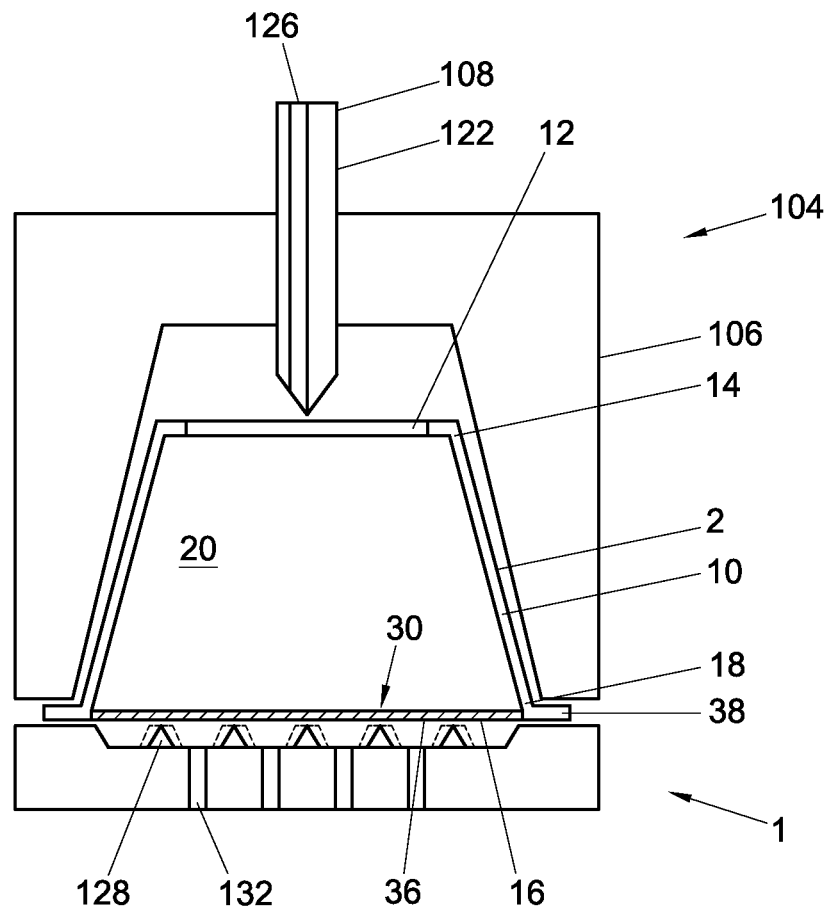
FIG. 1 shows an embodiment of the system according to the invention.

FIG. 1 shows an example of an embodiment of a system 1 according to the invention for preparing a predetermined quantity of beverage suitable for consumption using an extractable product. The system 1 comprises an exchangeable capsule 2, and an apparatus 104. The apparatus 104 comprises a receptacle 106 for holding the exchangeable capsule 2. In this example, the receptacle 106 has a shape complementary to the shape of the capsule 2. In FIG. 1 a gap is drawn between the capsule 2 and the receptacle 106 for clarity. It will be appreciated that, in use, the capsule 2 may lie in contact with the receptacle 106. The apparatus 104 further comprises a fluid dispensing device 108 for supplying an amount of a fluid, such as water, under pressure to the exchangeable capsule 2.

In the system 1 shown in FIG. 1, the exchangeable capsule 2 comprises a circumferential wall 10, a bottom 12 closing the circumferential wall 10 at a first end 14, and a lid 16 closing the circumferential wall 10 at a second end 18 opposite the bottom 12. The circumferential wall 10, the bottom 12 and the lid 16 enclose an inner space 20 comprising the extractable product. In this example, the exchangeable capsule 2 comprises an amount of extractable product suitable for preparing a single portion of the beverage, preferably a single cup of the beverage, e.g. from 30-200 ml of the prepared beverage. The exchangeable capsule, thus, is a single-portion-pack. The extractable product may e.g. be roasted and ground coffee.

The system 1 of FIG. 1 comprises bottom piercing means 122 intended for piercing an alternative capsule. FIG. 1 shows the bottom piercing means in an extended position, intended for creating an entrance opening in the bottom of an alternative capsule.

In FIG. 1 the piercing means 122 comprise a bore 126 through which the fluid is supplied to an inner space of the receptacle 106. The fluid, here hot water under a pressure of e.g. more than four bars, e.g. twelve bars, will flow through the entrance filter 34 into the inner space 20 of the capsule 2 for extracting desired substances from the extractable product, in this example approximately 4-8 grams of roasted and ground coffee, for preparing, in this example the single cup of the beverage, here coffee. The fluid may be supplied with a pressure between 4 and 20 bars, preferably between 4.5 and 18 bars and more preferably between 5 and 15 bars. Depending on the compaction, grain size and/or desired character of the beverage, between 4 and 10 grams of extractable product may be contained in the capsule 2.

Thus, more in general, in the example of FIG. 1, the bottom 12 comprises an entrance area, and the system 1 is arranged for bringing the fluid dispensing device 108 in fluid connection with the entrance area for supplying the fluid to the extractable product for preparing the beverage.

In the example of FIG. 1, the circumferential wall 10 is substantially rigid. The circumferential wall may e.g. comprise a plastics material and may be formed by e.g. injection molding, vacuum-forming, thermoforming or the like. Also, in the example of FIG. 1, the circumferential wall 10 is frusto-conical, but other shapes are also possible. For example, the circumferential wall may be cylindrical or pyramidal or hemispherical or polygonal such as hexagonal or octagonal.

In the example of FIG. 1 the bottom 12 is integral with the circumferential wall. Thus, the fluid is supplied to the extractable product via the entrance area which causes the extractable product to be wetted over substantially the entire cross section of the capsule 2. Hence, a very homogeneous supply of fluid to the extractable product may be obtained.

Further, the system 1 of FIG. 1 comprises lid piercing means 128 intended for piercing the lid of an alternative capsule when the lid sufficiently presses against the lid piercing means 128 under the influence of the pressure of the fluid and/or beverage in the alternative capsule for creating at least one exit opening through which the beverage can drain from the prior art alternative capsule.

According to the invention, the capsule 2 comprises an exit area, through which the beverage can drain from the capsule 2. According to the invention, the exit area comprises an exit filter 36. The exit filter 36 may be a filter layer comprising a layer of a non-woven and/or woven fibrous material, wherein the filter layer comprises at least one first region where the non-woven and/or woven material has been sealed to prevent egress of liquid there through and at least one second region where the non-woven and/or woven material has not been sealed to allow egress of liquid there through. Under influence of the pressure inside the capsule 2, the exit filter 36 may deform against the lid piercing means, but it may not tear, rupture or be pierced by the lid piercing means. In an other embodiment, the exit filter 36 may not deform under influence of fluid pressure in the capsule, so the dimensions of the second regions remain approximately the same, i.e. less than 3% deviation during use. Due to the non-woven and/or woven material, a stable exit filter 36 may be provided that may stay intact under influence of the pressure. Sufficient pressure may be developed in the capsule 2 for a good quality beverage. Moreover, due to the non-woven and/or woven layer, the exit filter may be sufficient strong and sufficient stiff, the pressure development may be reproducible from one capsule to another, thereby improving the reproducibility of the brewed beverage.

Alternatively, or additionally, the exit filter 36 is adapted to the lid piercing means 128 such that the capsule 2, in use, is not pierced by the lid piercing means 128 and the lid 16 stays intact. More in general it applies that the exit filter 36 and the lid piercing means 128 are adapted to each other such that the capsule 2, in use, is not pierced by the lid piercing means 128 and the lid 16 stays intact.

In the example of FIG. 1, the lid piercing means 128 are shown having sharp toothed points intended for piercing the lid. It will be appreciated that, alternatively, the lid piercing means 128 may have blunt piercing surfaces, e.g. as indicated with dashed lines in FIG. 1. In such embodiment, an alternative capsule may, nevertheless, be pierced by the blunt piercing means 128, e.g. when the lid of the alternative capsule consists of a sheet of aluminum foil. Parameters, such as the non-woven and/or woven material, the distribution and/or plurality of the first and second regions, the stiffness and/or strength, of the exit filter of the capsule 2 of the system according to the invention can be chosen such that the exit filter 36 may not to be pierced or torn. It will be appreciated that when the lid piercing means are blunt, the parameters of the exit filter may be chosen to suit these blunt piercing means. When the piercing means are blunt, the exit filter may e.g. be thinner than when the lid piercing means are sharp, while guaranteeing that the exit filter has the sufficiently high tear strength and/or forming the sufficiently low flow resistance not to be pierced or torn.

It is possible that the lid piercing means comprise ridges against which the lid, in use, abuts. Such ridges may be formed by the blunt piercing means 128 as shown with dashed lines in FIG. 1. The ridges may e.g. form at least 10%, possibly at least 25% of the portion of the surface of the receptacle 106 which, in use, coincides with the portion of the surface area of the lid 16 overlying the second, end 18. Hence, in use, the lid 16 may be supported by the ridges over, e.g. at least 10%, preferably at least 25%, of the portion the surface area of the lid 16 overlying the second, open, end 18. As already indicated, the lid of an alternative capsule may be pierced by such ridges, whereas parameters of the exit filter 36 of the capsule 2 of the system 1 according to the invention may easily be chosen such that the exit filter has the sufficiently high tear strength and/or sufficient stiffness not to be pierced or torn. The exit filter may be sufficiently strong and/or sufficiently stiff such that the exit filter only abuts against the top surfaces of the ridges, and does not deform until the bottom between the ridges. Deformation of the exit filter is thus limited. It will be appreciated that when the lid piercing means comprise ridges, the parameters of the exit filter may be chosen to suit such lid piercing means.

In the example of FIG. 1, the ridges comprise edges which are not sharp. In this example a radius of curvature of the edges is approximately 50 μm, although other radii are conceivable, such as 100, 200 or 500 μm. The prior art alternative capsule may, nevertheless, be pierced by the blunt piercing means 128, e.g. when the lid consists of a sheet of aluminum foil. It will be appreciated that when the lid piercing means comprise non-sharp edges, the parameters of the exit filter 36 may be chosen to suit such lid piercing means. Parameters of layers of the exit filter 36 of the capsule 2 of the system according to the invention can be chosen such that the exit filter 36 may not be pierced or torn.

It is also possible that the ridges of the lid piercing means 128 have a convex top against which the lid 16 abuts. Hence, when the lid, in use, is pressed against the ridges, the surface area over which the lid is supported by the ridges increases, thus reducing the local pressure exerted on the lid by the ridges. Thus it is possible to provide, in an easy manner, that the lid, in use, does not tear and/or rupture and stays intact.

In the example of FIG. 1 the exit filter 36, forming an exit area of the capsule 2, through which the beverage, here coffee, can drain from the capsule, is formed by a filter layer of non-woven and/or woven material, such as filter paper, comprising at least one first region where the non-woven and/or woven material has been sealed to prevent egress of liquid there through, and at least one second region where the non-woven and/or woven material has not been sealed to allow egress of liquid there through. The non-woven and/or woven material may comprise polymeric fibers, such as polypropylene or polyethylene. The non-woven and/or woven material may also comprise biodegradable materials, such as e.g. paper fibers.

In the embodiments shown here the entire lid 16 is formed as the exit filter 36. Thus, the fluid can drain from the capsule 2 over a large area. Hence, a very homogeneous drain of beverage from the extractable product is obtained.

Figure 2:
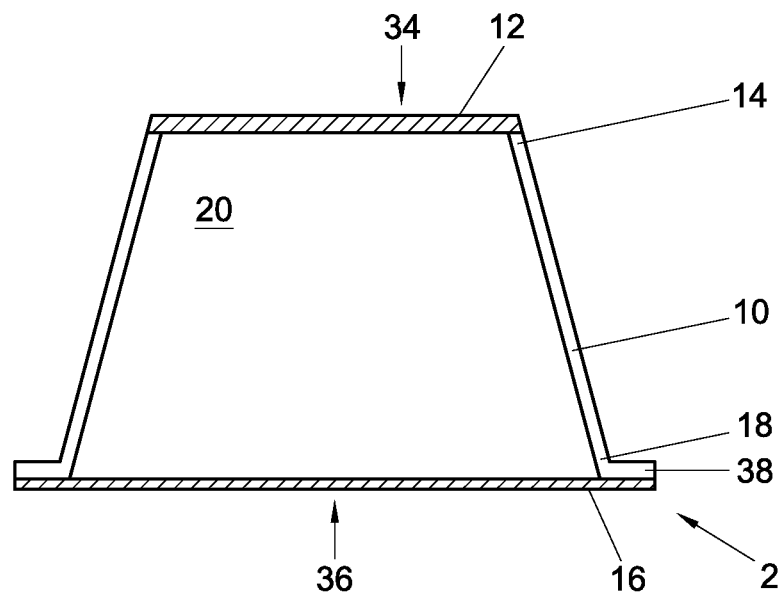
FIG. 2 shows a first embodiment of the capsule according to the invention.
Figure 3:
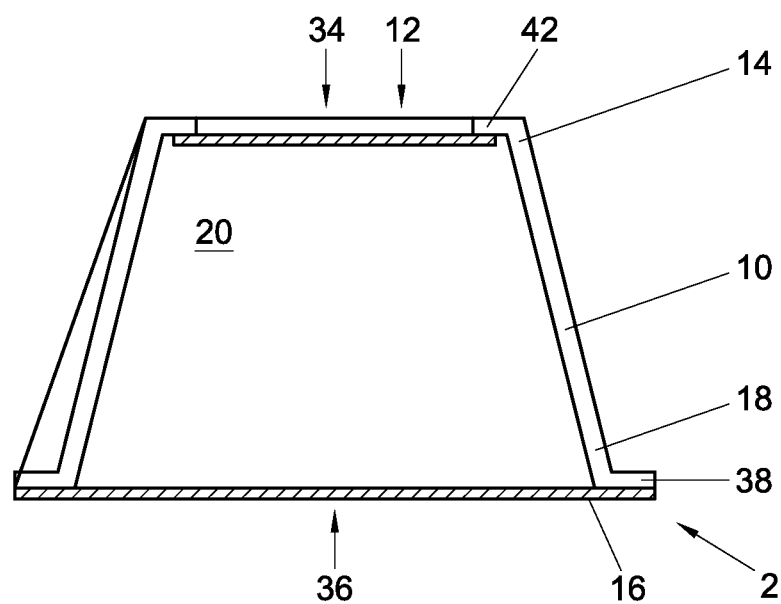
FIG. 3 shows a second embodiment of the capsule according to the invention.

In the example of FIG. 1, the capsule 2 comprises an outwardly extending rim 38 at the second end 18, wherein the lid 16 is attached to the outwardly extending rim 38 and/or an inner surface of the circumferential wall 10, e.g. by gluing, welding or the like. In the example of FIG. 2 and FIG. 3, the exit filter 36, is attached to the outwardly extending rim 38.

In the example of FIG. 1, the entrance area is open to allow liquid flowing there through in the capsule 2. In the example of FIG. 2, the entrance area of the bottom 12 is provided with an entrance filter 34. According to an aspect of the invention, the entrance filter 34 comprises a filter layer, wherein the filter layer comprises a layer of non-woven and/or woven fibrous material, wherein the filter layer comprises at least one first region where the non-woven and/or woven material has been sealed to prevent egress of liquid there through and at least one second region where the non-woven and/or woven material has not been sealed to allow egress of liquid there through. According to an aspect of the invention, the capsule 2 comprises an entrance filter 34 which is positioned at a distance from the bottom piercing means 12, such that the capsule 2 is not pierced by the bottom piercing means 122 and the bottom 12 stays intact when the bottom piercing means is brought in the extended position.

In the example of FIG. 2, the entrance filter 34 is provided as the bottom 12. In the example of FIG. 3, the entrance filter 34 is provided as a separate filter layer that is attached to inwardly extending rims 42 of the bottom 12. The entrance filter layer 34 may also be attached to an inner or outer surface of the circumferential wall 10, and/or to an inner or outer surface of the inwardly extending rims 42 of the bottom 12.

In general, parameters of the layers of the exit filter 36 of the capsule 2 of the system 1 according to the invention can be chosen such that the exit filter does not tear or rupture, e.g. having the sufficiently high tear strength and/or having sufficiently high stiffness and/or forming the sufficiently low flow resistance not to be pierced or torn. It will be appreciated that the lid and/or the exit filter may not rupture or being torn by the lid piercing means 128. When the exit filter 36 is e.g. made of partly sealed filtering paper, parameters of the filtering paper, such as density, thickness and/or PE-content, distribution and/or plurality of the first and second regions, can easily be chosen to provide the exit filter having the sufficiently high tear strength and/or forming the sufficiently low flow resistance.

Figure 4:
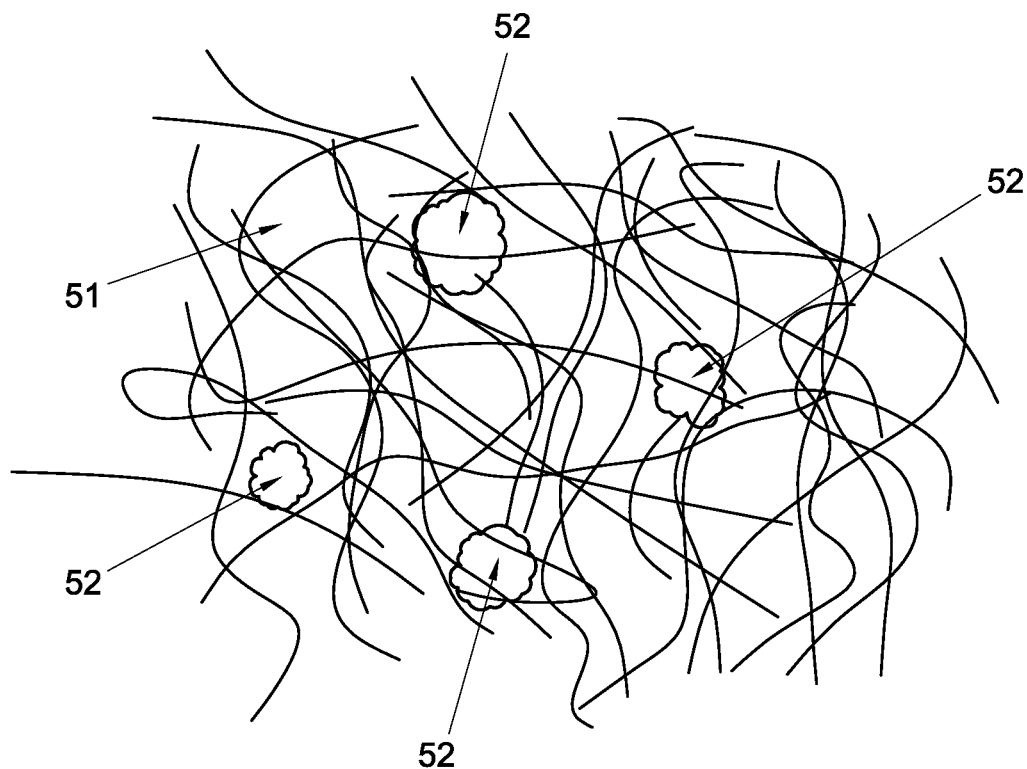
FIG. 4 shows an embodiment of a non-woven filter layer material according to the invention.

In FIG. 4 an embodiment is shown of a non-woven filter layer comprising first regions 51 where the non-woven material has been sealed and second regions 52 where the non-woven material has not been sealed. The second regions 52 are thus open to allow egress of liquid there through. The fibers in the non-woven material are chaotically provided in the material and do not have a preferential orientation or arrangement. The flow restriction for the liquid is provided by the non-woven filter layer. The non-woven filter layer usually comprises a number of filaments and/or fibers as shown in FIG. 4. The filaments can have different lengths and different sizes and can be provided from different materials.

The first regions of the non-woven filter layer can be sealed, e.g. by gluing, painting, melting or a resin. The second regions are left open or can be made open and are not sealed. Depending on the process of forming the second regions, the second regions may be entirely open, e.g. when the second regions are formed with a hot or cold needle, or filaments and/or fibers of the non-woven filter layer may still be present in the second regions, but then without e.g. resin between the filaments.

Preferably, the second regions do not deform, tear or rupture under influence of the fluid pressure. The second regions may be reinforced at the edges to prevent deformation, tear or rupture of the second regions. The edges may e.g. be reinforced with additional glue and/or paint or by heat melting of the edges. The second regions may be distributed approximately evenly over approximately the entire surface of the filter layer or the second regions may be provided in different patterns. Also, the second regions may be distributed randomly over approximately the entire surface of the filter layer. Also, the second regions may have different sizes. Preferably, the size of the second region is smaller than the size of most grains of the extractable product in the capsule, as to allow the extractable product to remain in the capsule and not minimize passing of grains through the second regions.

The entrance and/or exit filter may be provided as a multi-layer filter of layers of non-woven and/or woven fibrous material. Preferably, the layers are bonded together to provide a stable filter. A stable filter may allow sufficient pressure built up in the capsule and may be sufficiently strong and/or stiff not to be pierced or torn by lid or bottom piercing means. Also, the filter layer may be sufficiently strong and/or stiff to prevent deformation and/or rupture of the second regions. Preferably, the first and second regions of one filter layer correspond with the first and second regions respectively of the additional filter layer to allow liquid to flow through the corresponding second regions.

It shall be obvious that the invention is not limited in any way to the embodiments that are represented in the description and the drawings. Many variations and combinations are possible within the framework of the invention as outlined by the claims. Combinations of one or more aspects of the embodiments or combinations of different embodiments are possible within the framework of the invention. All comparable variations are understood to fall within the framework of the invention as outlined by the claims.

What is claimed is:

1. A capsule and apparatus for preparing a predetermined quantity of beverage suitable for consumption using an extractable product, comprising:
    a first exchangeable open capsule;
    a second, alternative capsule; and
    an apparatus comprising a receptacle for holding the first exchangeable open capsule, and a fluid dispensing device for supplying an amount of a fluid, under pressure to the first exchangeable open capsule;
    wherein the first exchangeable open capsule comprises:
        a substantially rigid circumferential wall,
        a bottom closing the circumferential wall at a first end, and
        a lid closing the circumferential wall at a second end opposite the bottom,
    wherein the wall, bottom and lid enclose an inner space comprising the extractable product,
    wherein the bottom comprises an entrance area and the fluid dispensing device is configured to be in fluid connection with the entrance area for supplying the fluid to the extractable product for preparing the beverage,
    wherein the lid comprises an exit area and the apparatus comprises an outlet which, in use, is in fluid communication with the exit area for draining the prepared beverage from the first exchangeable open capsule and supplying the beverage to a container;
    wherein the receptacle is arranged for draining the prepared beverage from the first exchangeable open capsule through the exit area;
    wherein the exit area of the first exchangeable open capsule comprises a filter layer, wherein the filter layer comprises a layer of a non-woven and/or woven fibrous material, wherein the filter layer of non-woven and/or woven fibrous material includes a first side that faces the extractable product and a second side that forms an outer surface of the exchangeable capsule;
    wherein prior to use the filter layer of the exit area of the first exchangeable open capsule comprises at least one first region where the non-woven and/or woven material has been sealed to prevent egress of liquid there through, and a plurality of second regions where the non-woven and/or woven material has not been sealed to allow egress of liquid there through;
    wherein the first region is sealed to prevent egress of liquid therethrough; and
    wherein the plurality of second regions are not sealed to allow egress of liquid therethrough, and
    wherein the receptacle comprises lid piercing means intended for piercing an exit area of the second, alternative capsule when the exit area sufficiently presses against the lid piercing means under the influence of the pressure of the fluid and/or beverage in the second alternative capsule, and
    wherein the lid piercing means and the filter layer of the first exchangeable open capsule are adapted to each other such that the filter layer of the first exchangeable open capsule, in use, is not pierced by the lid piercing means and stays intact.

2. The capsule and apparatus of claim 1, wherein the non-woven and/or woven material of said layer of the filter layer comprises polymeric fibers.

3. The capsule and apparatus of claim 1, wherein the non-woven and/or woven material of said layer of the filter layer comprises biodegradable fibers.

4. The capsule and apparatus of claim 1, wherein the filter layer is a multi-layer filter comprising a further layer, wherein the further layer is a perforate and/or porous layer.

5. The capsule and apparatus of claim 4, wherein the further layer is a layer of non-woven and/or woven fibrous material.

6. The capsule and apparatus of claim 1, wherein the entrance area comprises a filter layer, wherein the filter layer comprises a layer of non-woven and/or woven material, wherein the filter layer comprises at least one first region where the non-woven and/or woven material has been sealed to prevent egress of liquid there through, and at least one second region where the non-woven and/or woven material has not been sealed to allow egress of liquid there through.

7. The capsule and apparatus of claim 6, wherein the non-woven and/or woven material of said layer of the filter layer comprises polymeric fibers.

8. The capsule and apparatus of claim 6, wherein the non-woven and/or woven material of said layer of the filter layer comprises biodegradable fibers.

9. The capsule and apparatus of claim 6, wherein the filter layer of the entrance area is a multi-layer filter comprising a further layer, wherein the further layer is a perforate and/or porous layer.

10. The capsule and apparatus of claim 9, wherein the further layer is a layer of non-woven and/or woven material.

11. The capsule and apparatus of claim 4, wherein openings and/or perforations of the further layer correspond with the plurality of second regions of the layer of non-woven and/or woven material.

12. The capsule and apparatus of claim 1, wherein plurality of the second regions of the filter layer are distributed over substantially the entire surface of the filter layer.

13. The capsule and apparatus of claim 1, wherein the receptacle comprises bottom piercing means intended for piercing an entrance area of the second, alternative capsule for creating at least one entrance opening for supplying the fluid to the extractable product through said at least one entrance opening, and
   wherein the entrance area of the first exchangeable open capsule comprises an entrance filter for supplying the fluid to the extractable product there through which entrance filter, in use, is positioned at a distance from the bottom piercing means, such that the entrance filter of the first exchangeable open capsule is not pierced by the bottom piercing means and stays intact.

14. The capsule and apparatus of claim 1, wherein the fluid dispensing device is arranged for supplying the fluid to the first exchangeable open capsule under a pressure of approximately 4-20 bars, preferably 4.5-18 bars, more preferably 5-15 bars.

15. The capsule and apparatus of claim 1, wherein the circumferential wall is cylindrical, hemispherical, frustoconical or polygonal.

16. The capsule and apparatus of claim 1, wherein the extractable product comprises roasted and ground coffee.

17. A capsule and apparatus for preparing a predetermined quantity of beverage suitable for consumption using an extractable product, the system comprising:
   a first exchangeable open capsule;
   a second, alternative capsule; and
   an apparatus comprising a receptacle for holding the first exchangeable open capsule, and a fluid dispensing device for supplying an amount of a fluid, under pressure to the first exchangeable open capsule;
   wherein the first exchangeable open capsule comprises:
      a substantially rigid circumferential wall,
      a bottom closing the circumferential wall at a first end, and
      a lid closing the circumferential wall at a second end opposite the bottom,
   wherein the wall, bottom and lid enclose an inner space comprising the extractable product,
   wherein the bottom comprises an entrance area and the fluid dispensing device is configured to be in fluid connection with the entrance area for supplying the fluid to the extractable product for preparing the beverage,
   wherein the lid comprises an exit area and the apparatus comprises an outlet which, in use, is in fluid communication with the exit area for draining the prepared beverage from the first exchangeable open capsule and supplying the beverage to a container;
   wherein the receptacle is arranged for draining the prepared beverage from the first exchangeable open capsule through the exit area;
   wherein the exit area of the first exchangeable open capsule comprises a filter layer, wherein the filter layer comprises a layer of a non-woven and/or woven fibrous material, wherein the filter layer of non-woven and/or woven fibrous material includes a first side that faces the extractable product and a second side that forms an outer surface of the exchangeable capsule;
   wherein prior to use the filter layer of the exit area of the first exchangeable open capsule comprises at least one first region where the non-woven and/or woven material has been sealed to prevent egress of liquid there through, and a plurality of second regions where the non-woven and/or woven material has not been sealed to allow egress of liquid there through;
   wherein the first region is sealed to prevent egress of liquid therethrough;
   wherein the plurality of second regions are not sealed to allow egress of liquid therethrough;
   wherein the receptacle comprises lid piercing means intended for piercing an exit area of the second, alternative capsule when the exit area sufficiently presses against the lid piercing means under the influence of the pressure of the fluid and/or beverage in the second alternative capsule for creating at least one exit opening through which the beverage can drain from the alternative capsule;
   wherein the lid piercing means and the filter layer of the first exchangeable open capsule are adapted to each other such that the filter layer of the first exchangeable open capsule, in use, is not pierced by the lid piercing means and stays intact; and
   wherein the non-woven and/or woven material in the second regions acts as a filter preventing extractable product from leaving the first exchangeable open capsule.

* * * * *